United States Patent
Prasad et al.

(10) Patent No.: US 11,709,683 B2
(45) Date of Patent: Jul. 25, 2023

(54) STATE SEMANTICS KEXEC BASED FIRMWARE UPDATE

(71) Applicant: EMC IP Holding Company LLC, Hopkinton, MA (US)

(72) Inventors: Parmeshwr Prasad, Hopkinton, MA (US); Rahul Vishwakarma, Hopkinton, MA (US); Bing Liu, Hopkinton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 287 days.

(21) Appl. No.: 16/987,564

(22) Filed: Aug. 7, 2020

(65) Prior Publication Data

US 2022/0043659 A1     Feb. 10, 2022

(51) Int. Cl.
*G06F 9/44* (2018.01)
*G06F 8/65* (2018.01)
*G06F 9/4401* (2018.01)
*G06F 12/0895* (2016.01)

(52) U.S. Cl.
CPC .............. *G06F 9/4401* (2013.01); *G06F 8/65* (2013.01); *G06F 12/0895* (2013.01); *G06F 2212/608* (2013.01)

(58) Field of Classification Search
CPC ....................................................... G06F 9/44
See application file for complete search history.

(56) References Cited

U.S. PATENT DOCUMENTS

| | | | |
|---|---|---|---|
| 10,732,961 B1 * | 8/2020 | Madasamy | G06F 8/656 |
| 11,385,902 B2 * | 7/2022 | Alon | G06F 11/2284 |
| 2007/0168699 A1 * | 7/2007 | Nellitheertha | G06F 11/1441 714/E11.138 |
| 2012/0096252 A1 * | 4/2012 | Arditti | G06F 8/656 713/2 |
| 2014/0129875 A1 * | 5/2014 | Zhou | G06F 11/0778 714/20 |
| 2014/0281463 A1 * | 9/2014 | Even | G06F 1/32 713/2 |
| 2015/0103644 A1 * | 4/2015 | Bharadwaj | H04L 67/34 370/254 |
| 2017/0230179 A1 * | 8/2017 | Mannan | H04L 9/3226 |
| 2017/0329593 A1 * | 11/2017 | McMullen | G06F 11/1433 |
| 2018/0123537 A1 * | 5/2018 | Salle | H03L 7/16 |
| 2021/0034401 A1 * | 2/2021 | Kletzander | G06F 9/4843 |
| 2021/0136147 A1 * | 5/2021 | Giassa | H04L 67/1051 |
| 2021/0157624 A1 * | 5/2021 | Saxena | G06F 9/45558 |
| 2021/0194904 A1 * | 6/2021 | Zhang | H04L 63/1416 |

FOREIGN PATENT DOCUMENTS

| | | | |
|---|---|---|---|
| CN | 104102528 A | † | 10/2014 |
| CN | 105376335 B | † | 12/2019 |

\* cited by examiner
† cited by third party

*Primary Examiner* — Phil K Nguyen
(74) *Attorney, Agent, or Firm* — Womble Bond Dickinson (US) LLP

(57) ABSTRACT

A kexec-based system update process wherein user-specific data is transferred on reboot of the second kernel. Upon initializing kexec load, buffer memory is assigned to the second kernel and the system loads control pages of fixed size for the second kernel boot, and also loads user-specific data onto extended control pages of variable size. Upon boot of the second kernel, the user-specific data is extracted from the extended control pages and transferred to the corresponding applications.

18 Claims, 4 Drawing Sheets

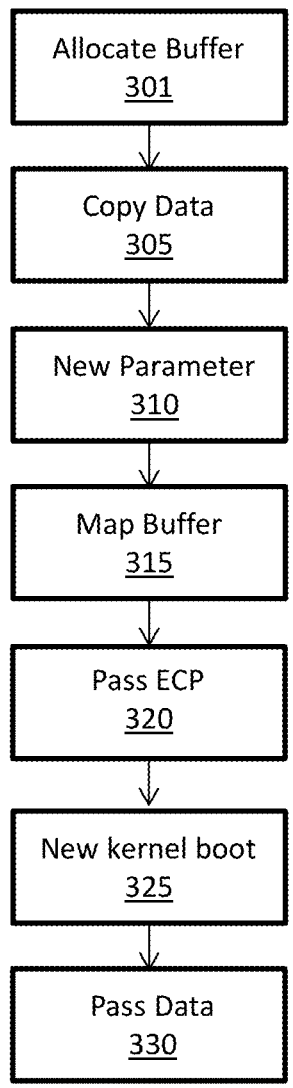
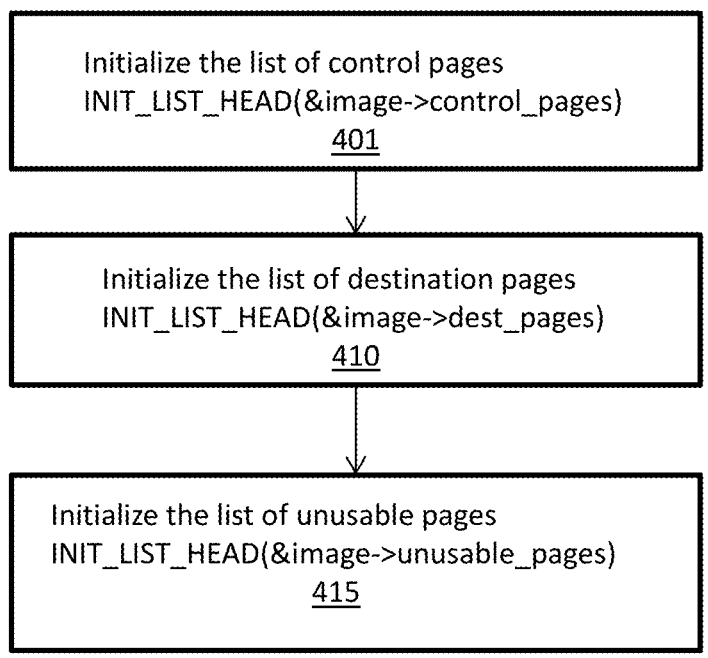
Figure 3
Figure 4

STATE SEMANTICS KEXEC BASED FIRMWARE UPDATE

TECHNICAL FIELD

This disclosure relates to managing system availability during upgrades.

BACKGROUND

During reboot period, the rebooting system is unavailable for use. However, the time period associated with a full reboot can be minimized by using kexec (kernel execution). The kexec is a mechanism of the Linux kernel that allows booting of a new kernel from the currently running one. The kexec mechanism been used to provide improved system availability during upgrades and thereby also shorten the upgrade time.

In Linux, kexec is a system call that enables loading and booting into another kernel from the currently running kernel, by performing the function of the boot loader from within the kernel. The primary difference between a standard system boot and a kexec boot is that the hardware initialization normally performed by the BIOS or firmware is not performed during a kexec boot, Thereby reducing the time required for a reboot.

While kexec improves system's availability, the subject inventors have identified the following shortcomings of the current kexec-based upgrade workflow. For example, kexec lacks the capability to transfer user and/or configuration data to the new kernel. Using kexec mechanism, the updated system boots to a new operating system and improves availability by avoiding POST (power-on self-test) and hardware boot. However, most of the control and performance data generated over the time by the previous OS and related to different DDOS operations is lost across kexec and the new OS must regenerate it. Using the kexec mechanism, data is passed across the different kexec OS by using a secondary storage, which consumes processing time, thereby slowing the performance. Also, current methods have no mechanism for transferring user data to the new kernel dynamically and using elastic page size. The disclosed embodiments provide solutions to these issues.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

FIG. 3 is a flow chart illustrating an example of loading process according to one or more embodiments of the disclosure.

FIG. 4 is a flow chart illustrating an example of a process for passing control pages to linked list of descriptor pages according to one or more embodiments of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) that improve the kexec process, especially when updating or upgrading a system such as, e.g., in Dell/EMC Data Domain™ environment.

Figure 1:
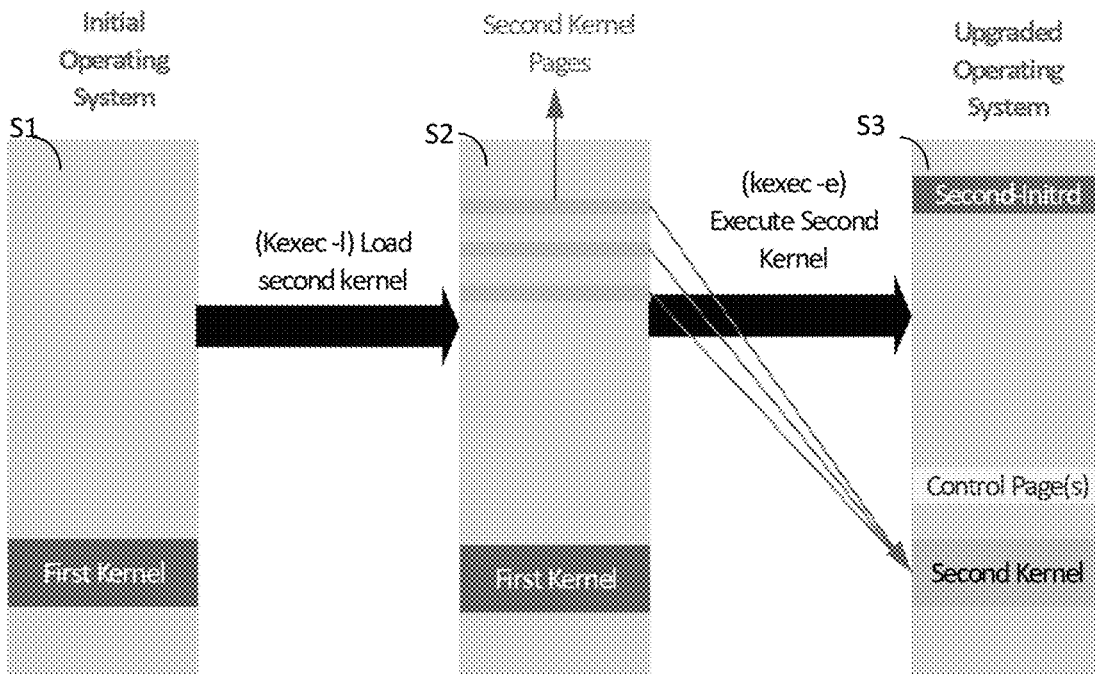
FIG. 1 is a schematic illustrating the two-step kexec process according to the prior art.

FIG. 1 illustrates a kexec approach to upgrading Data Domain OS (DDOS). In S1 an initial operating system runs on a first kernel. The system then executes the first step in the kexec process, which is the loading step, using the command kexec -l. In S2 a second kernel was loaded and pages are allocated internally for the second kernel. The kexec process also creates control pages of size PAGE_SIZE, which are fixed in size (4k). The control pages are managed in the form of control-page link list. The second step using the command kexec-e, kexec executes the second kernel and second-initrd is booted to run the upgraded operating system.

Figure 2:
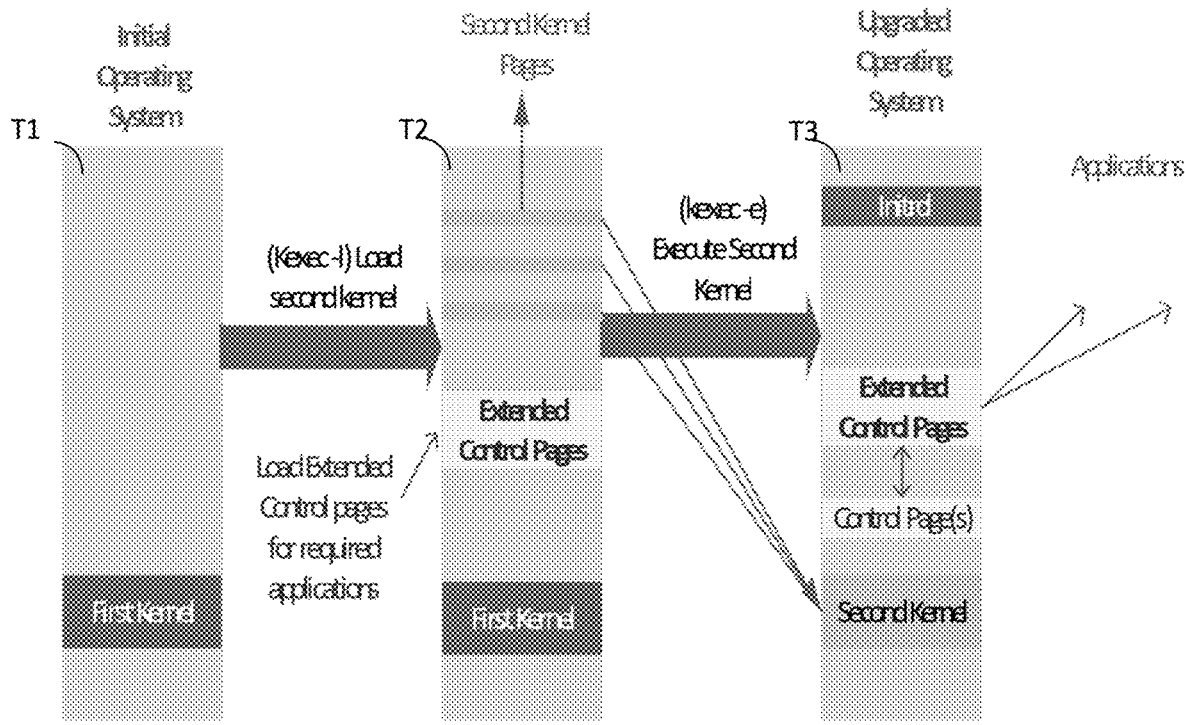
FIG. 2 is a schematic illustrating an example of a two-step kexec process according to an embodiment of the disclosure.

FIG. 2 illustrates a kexec approach to upgrading DDOS with additional extended control pages. The extended control pages are the intermediary between the old kernel and the new kernel. The extended control pages have the information needed to be passed to the new kernel. The extended control pages are elastic in nature, i.e., have variable size. The control pages store application data from the RAM memory, that would have been lost when the power is removed from the RAM memory upon reboot.

In T1 an initial operating system runs on the first kernel. In T2 the kexec -l command is executed and the first kernel loads the second kernel and second kernel pages of fixed size are allocated in memory. Additionally, extended control pages, variable in size, are allocated for user/application specific data. These memory locations will be used for copying custom data needed for running applications, such as application data stored in RAM during T1. The extended control pages are added to the existing control-page link list. This may be achieved by having a hook in copy_user_segment_list( ) call. In T3, once the second (new) kernel is booted the extended control pages are extracted and passed to required applications.

Note that by allocating the extended control pages and storing user/application specific data, this data is available immediately upon execution of the second kernel. Conversely, if that data was stored in a file, the data cannot be accessed at least until the file system and device are ready. Therefore, the extended control pages enable a much faster return to operation of the updated OS.

In disclosed embodiments the process proceeds as illustrated in the flow chart of FIG. 3. At step 301 a new buffer is allocated, and this new buffer must be destination of itself, i.e., no other operations (copy/paste) are allowed in this memory space. This new buffer is passed to the new kernel. At 305 the user transaction data is copied into the new buffer. At 310 a new parameter is implemented in kexec load option to handle passing a custom buffer to the new kexec kernel. The new parameter will have mechanism for the second kernel to locate the new buffer. Once the kexec kernel is loaded it will verify the new buffer and at 315 and map the buffer to the new kernel memory space. At 320 the extended control pages (ECP) are passed in a linked list of descriptor pages detailing the source pages of the new kernel, and the destination addresses of those source pages. Since this data structure is not used in the context of the current OS, it must be self-contained. An example of a process is illustrated in the flow chart of FIG. 4. In 401 the process initializes the list of control pages. In 410 the process initializes the list of destination pages. At 415 the process initializes the list of unusable pages.

Turning back to FIG. 3, at 325 a boot of the new kexec kernel is triggered (kexec -e). Once the new kernel is booted and is running, it extracts the user information from extended control space, collects the data, and at 330 passes it to relevant daemon/application. In this way, the user data is available immediately after boot.

Figure 5:
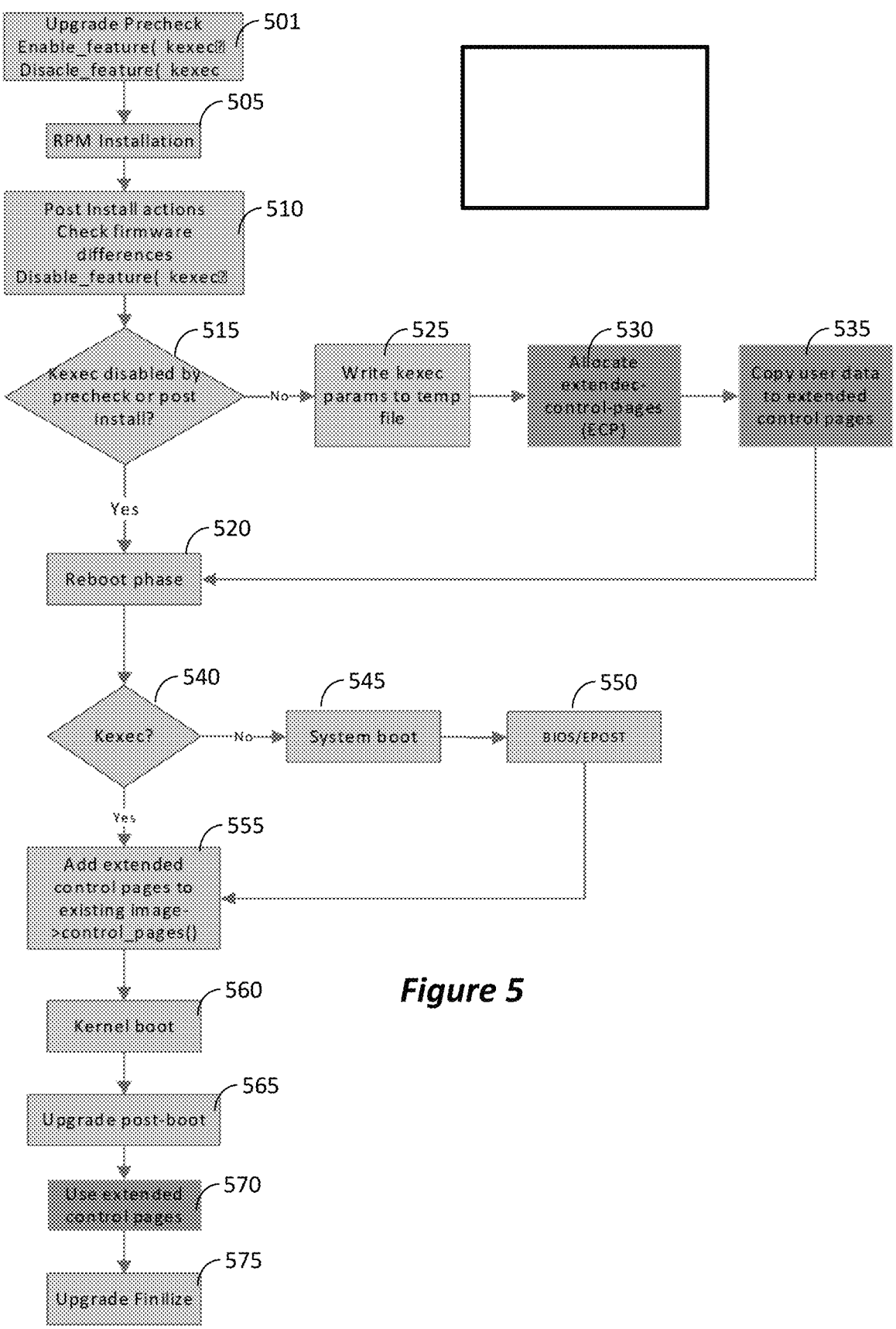
FIG. 5 is a flow diagram illustrating an example method of performing an upgrade using kexec mechanism with transfer of extended control pages according to one or more embodiments of the disclosure.

FIG. 5 illustrates a flow chart of an embodiment of performing an upgrade using kexec mechanism with transfer of extended control pages. The process begins by the upgrade precheck in 501. At 505 an RPM install is performed to obtain the new update package. In step 510 the process performs the post-install actions and check firmware differences. At 515 it is checked whether kexec was disabled during precheck or post install. If it was disabled, the process proceeds to reboot phase at 520. On the other hand, if kexec was not disabled, the process proceeds to 525 and writes kexec parameters to a temporary file. At 530 the process allocates extended control pages and at 535 copies user data to extended control pages. The process then reverts to the reboot phase 520.

At step 540 a decision is made whether reboot should be perform as kexec or not, e.g., whether kexec -e command was entered. If not, the process proceeds to system boot at 545 and then BIOS and POST at 550. If at 540 the return is yes, the process proceeds to 555 and add the extended control pages to the existing image control pages. At 560 the process proceeds to kernel boot and at 565 to the upgrade post boot. At the 570 the process proceeds to use the extended control pages for the relevant applications, and at 575 the process finalizes the upgrade.

According to an embodiment, the process is used for maintaining cache tuned runtime parameters. In IO/network techniques, many parameters are tuned on runtime (like IO timeout, retry times, RTT, bandwidth QoS weight). In practice, the parameters are given an initialized value and then they are tune adaptively according the system performance. Such adaptive algorithm can leverage online machine learning or other statistics-based method. It usually requires some running time to train the best converged values.

Ordinarily, after upgrade reboot, since the power to the cache memory has been removed, the trained values of these parameters are lost and need additional runtime time to train and arrive at the proper parameters values. If the values are saved in files, it would require additional time to access the files, at least until the file system is up and running. Moreover, some parameters have to be loaded during system boot up, such that file access would slow down the system boot up process. Conversely, according to an embodiment, the parameters trained values are added to the buffer in the extended control pages, such that the kexec kernel passes these values to the appropriate application.

Figure 6:
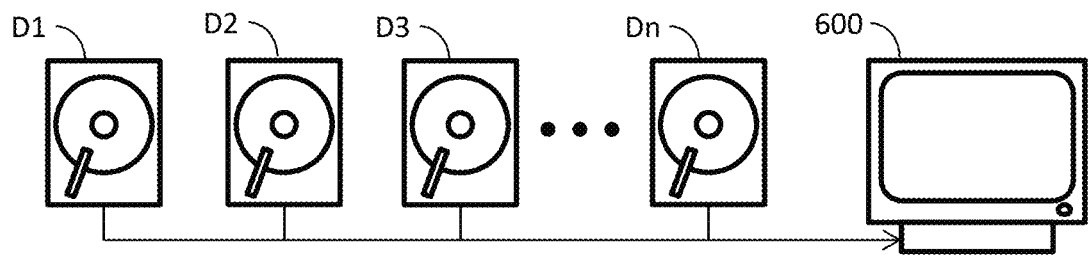
FIG. 6 is a diagram illustrating an example for application environment implementing processes according to one or more embodiments of the disclosure.

According to another embodiment, example of which is illustrated in FIG. 6, the disclosed process is employs in a system monitoring log for analytics dataset. For example, in machine learning applications, system parameters are used for performing analytics and decision making. In the scenario illustrated in FIG. 6, system 600 uses SMART parameters of disk drives D1-Dn for making predictions of shipping disks to customers based on forecast engine (deployed on a cloud or on-premises).

S.M.A.R.T. (or SMART) stands for Self-Monitoring, Analysis and Reporting Technology. The technology helps detect various reliability problems at an early stage, giving warning signs well in advance before the hard drive fails. By reading (and interpreting) the indicators, the user can prevent data loss by replacing the disk before the crash occurs. In such a scenario, the quality of the data is the most important factor for prediction accuracy. If few data points for particular timestamp are lost it will impact the accuracy of forecast engine, and eventually the confidence of the decision making—whether to ship disks to customers or not.

However, when using the disclosed process, the values of the SMART indicators are stored in the buffer of the extended control pages. Upon kexec kernel boot after upgrade, the kernel transfers the extended control pages to the SMART application, such that the prior data is not lost. Consequently no data point is ever missed and the input quality of data for the forecast engine will be based on complete data.

In a further embodiment, the process is employed in relation to cache controlled system parameters. Various controlled parameters may be saved in the extended control file, and the system may access them during system boot up. It includes whether some features enabled in this system or some static parameters setting (like HW monitor period value). Many applications need to load these parameters during boot up, with accessing files by default. The disclosed process enables the applications to get these values from memory cache, so that it accelerates the boot up process.

As can be understood, in disclosed embodiments the kexec is implemented to both upgrade DDOS and pass specific user data to corresponding applications. The data is passed using extended control pages. Consequently, a specific system state can be transferred to the new kernel.

Figure 7:
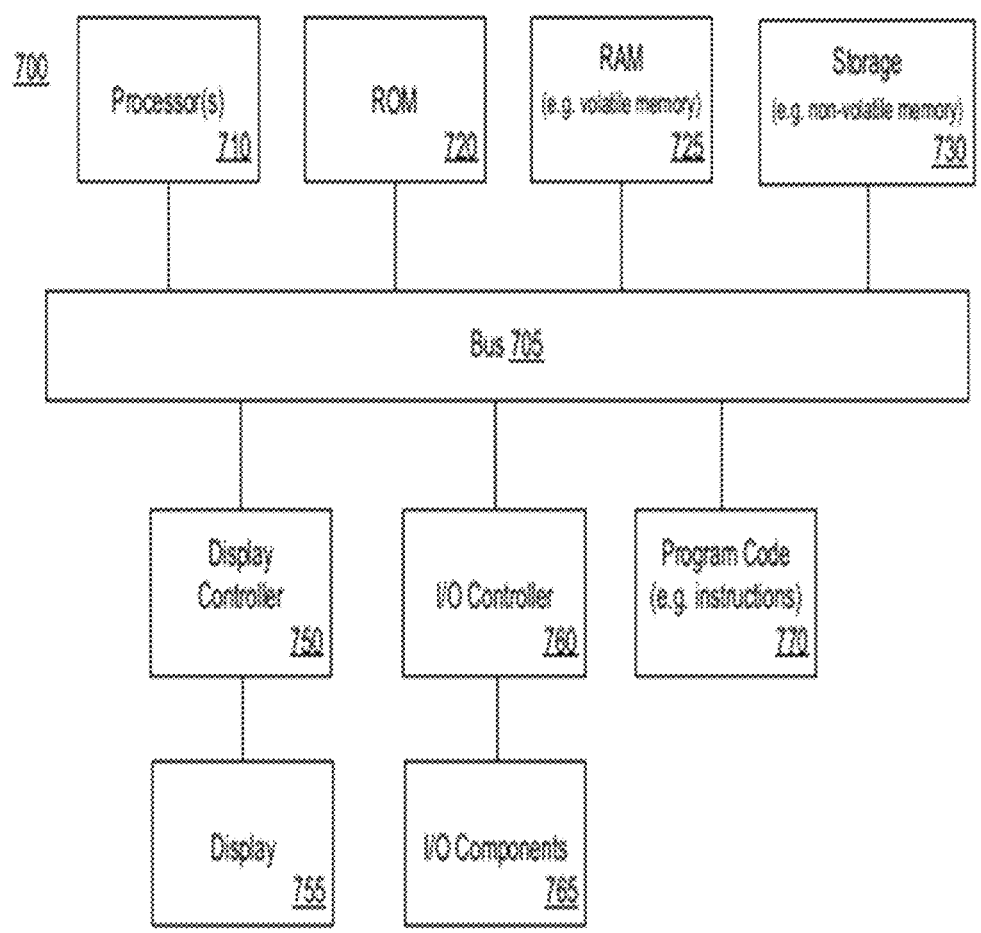
FIG. 7 is a block diagram illustrating an example of a computing system that may be used in conjunction with one or more embodiments of the disclosure.

FIG. 7 shows a block diagram of an example of a computing system that may be used in conjunction with one or more embodiments of the disclosure. For example, computing system 700 (or system, or server, or computing device, or device) may represent any of the devices or systems described herein that perform any of the processes, operations, or methods of the disclosure. Note that while the computing system 700 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 700 may include a bus 705 which may be coupled to a processor 710, ROM (Read Only Memory) 720, RAM (or volatile memory) 725, and storage (or non-volatile memory) 730. The processor(s) 710 may retrieve stored instructions from one or more of the memories 720, 725, and 730 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 710 may perform operations in an on-demand or "cloud computing" environment or as a service (e.g. within a "software as a service" (SaaS) implementation). Accordingly, the performance of operations may be distributed among the one or more processors 710, whether residing only within a single machine or deployed across a number of machines. For example, the one or more processors 710 may be located in a single geographic location (e.g. within a home environment, an office environment, or a server farm), or may be distributed across a number of geographic locations. The RAM 725 may be implemented as, for example, dynamic RAM (DRAM), or other types of memory that require power continually in order to refresh or maintain the data in the memory. Storage 730 may include, for example, magnetic, semiconductor, tape, optical, removable, non-removable, and other types of storage that maintain data even after power is removed from the system. It should be appreciated that storage 730 may be remote from the system (e.g. accessible via a network).

A display controller 750 may be coupled to the bus 705 in order to receive display data to be displayed on a display device 755, which can display any one of the user interface features or embodiments described herein and may be a local or a remote display device. The computing system 700 may also include one or more input/output (I/O) components 765 including mice, keyboards, touch screen, network interfaces, printers, speakers, and other devices. Typically, the input/output components 765 are coupled to the system through an input/output controller 760.

Program code 770 may represent any of the instructions, applications, software, libraries, toolkits, modules, components, engines, units, functions, logic, etc. as described herein (e.g. backup component 150). Program code 770 may reside, completely or at least partially, within the memories described herein (e.g. non-transitory computer-readable media), or within a processor during execution thereof by the computing system. Program code 770 may include both machine code, such as produced by a compiler, and files containing higher-level or intermediate code that may be executed by a computing system or other data processing apparatus (or machine) using an interpreter. In addition, program code 770 can be implemented as software, firmware, or functional circuitry within the computing system, or as combinations thereof. Program code 770 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified. Reference to ordinal numbers such as "first," "second," "third," etc. may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer readable medium storing a plurality of instructions, which when executed, cause the one or more processors to:
   receive a kexec -l command;
   responsive to receiving the kexec-l command, the processor to:
   assign control pages of fixed size in buffer memory;
   assign extended control pages of variable size in the buffer memory,
   wherein the extended control pages are added to a control-page link list; and
   store a user-specific data in the extended control pages;
   receive a kexec -e command; and
   responsive to receiving the kexec-e command, the processor to:
   execute a kexec boot of a second kernel according to the control pages; and
   extract the user-specific data from the extended control pages and pass the user-specific data to required applications.

2. The system of claim 1, wherein the kexec boot of the second kernel is done after completing an upgrade of an operating system.

3. The system of claim 1, wherein the user-specific data includes data previously stored in cache memory.

4. The system of claim 3, wherein the user-specific data includes tuned runtime parameters stored in the cache memory.

5. The system of claim 1, wherein the user-specific data includes Self-Monitoring, Analysis and Reporting Technology data.

6. The system of claim 1, wherein the user-specific data includes cache controlled system parameters.

7. A computer implemented method comprising:
receiving a kexec -l command;
responsive to receiving the kexec -l command:
assigning control pages of fixed size in buffer memory;
assigning extended control pages of variable size in the buffer memory, wherein the extended control pages are added to a control-page link list; and
storing a user-specific data in the extended control pages;
receiving a kexec -e command;
responsive to receiving the kexec -e command:
executing a kexec boot of a second kernel according to the control pages; and
extracting the user-specific data from the extended control pages and passing the user-specific data to required applications.

8. The method of claim 7, wherein the kexec boot of the second kernel is done after completing an upgrade of an operating system.

9. The method of claim 7, wherein the user-specific data includes data previously stored in cache memory.

10. The method of claim 9, wherein the user-specific data includes tuned runtime parameters stored in the cache memory.

11. The method of claim 7, wherein the user-specific data includes Self-Monitoring, Analysis and Reporting Technology data.

12. The method of claim 7, wherein the user-specific data includes cache controlled system parameters.

13. A computer program product comprising a non-transitory computer-readable medium having a computer-readable program code embodied therein to be executed by one or more processors, the program code including instructions to:
receive a kexec -l command;
responsive to receiving the kexec -l command:
assign control pages of fixed size in buffer memory;
assign extended control pages of variable size in the buffer memory, wherein the extended control pages are added to a control-page link list; and
store a user-specific data in the extended control pages;
receive a kexec -e command; and
responsive to receiving the kexec -e command:
execute a kexec boot of a second kernel according to the control pages; and
extract the user-specific data from the extended control pages and pass the user-specific data to required applications.

14. The computer program product of claim 13, wherein the kexec boot of the second kernel is done after completing an upgrade of an operating system.

15. The computer program product of claim 13, wherein the user-specific data includes data previously stored in cache memory.

16. The computer program product of claim 15, wherein the user-specific data includes tuned runtime parameters stored in the cache memory.

17. The computer program product of claim 13, wherein the user-specific data includes Self-Monitoring, Analysis and Reporting Technology data.

18. The computer program product of claim 13, wherein the user-specific data includes cache controlled system parameters.

* * * * *